Patented Apr. 22, 1952

2,593,720

UNITED STATES PATENT OFFICE 2,593,720

SUPPORTED PHOSPHORIC ACID CATALYST CONTAINING A PITCH RESIN BINDER AND ITS PREPARATION

Mitchell S. Bielawski, Chicago, Ill., assignor to Universal Oil Products Company, Chicago, Ill., a corporation of Delaware No Drawing. Application November 18, 1948, Serial No. 60,835

11 Claims. (Cl. 252—428)

This invention relates to the manufacture of catalysts useful in accelerating various types of reactions among organic compounds. In a more specific sense, the invention is concerned with the production of a particular type of solid catalyst which has special properties both in regard to its activity in accelerating and directing olefin polymerization reactions, in its stability in service, and in its relatively low corrosive properties when employed in ordinary commercial apparatus comprising various types of steel.

An object of this invention is a method of producing an olefinic hydrocarbon conversion catalyst which has a high crushing strength after use.

Another object of this invention is a highly active catalyst suitable for use in the polymerization of olefinic hydrocarbons and in other hydrocarbon conversion reactions involving olefins.

In one specific embodiment, this invention relates to a process for manufacturing a solid catalyst which comprises mixing a phosphoric acid, a siliceous adsorbent, and a pine wood pitch resin substantially insoluble in paraffinic hydrocarbons to form a composite, drying and calcining said composite.

In another embodiment, this invention relates to a process for manufacturing a solid catalyst which comprises mixing pyrophosphoric acid, diatomaceous earth, and a pine wood pitch resin substantially insoluble in paraffinic hydrocarbons to form a composite, forming said composite into particles, drying and calcining said particles.

The essential and active ingredient of the solid catalysts which are manufactured by the present process for use in organic reactions is an acid of phosphorus, preferably one in which the phosphorus has a valence of 5. The acid may constitute 60% to about 75% or more of the catalyst mixture ultimately produced, and in most cases is over 50% by weight thereof. Of the various acids of phosphorus, ortho-phosphoric acid ($H_3PO_4$) and pyrophosphoric acid ($H_4P_2O_7$) find general application in the primary mixtures, due partially to their cheapness and to the readiness with which they may be procured although the invention is not restricted to their use but may employ any of the other acids of phosphorus insofar as they are adaptable. It is not intended to infer, however, that the different acids of phosphorus which may be employed, will produce catalysts which have identical effects upon any given organic reaction as each of the catalysts produced from different acids and by slightly varied procedure will exert its own characteristic action.

In using ortho-phosphoric acid as a primary ingredient, different concentrations of the aqueous solution may be employed from approximately 75 to 100% or acid containing some free phosphorus pentoxide may even be used. (By this is meant that the ortho acid may contain a definite percentage of the pyro acid corresponding to the primary phase of dehydration of the orthophosphoric acid.) Within these concentration ranges, the acids will be liquids of varying viscosities and readily incorporatable with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures may be different from that employed with the ortho acid.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O.2P_2O_5$ which in turn may be considered as the acid resulting when three molecules of water are lost by four molecules of ortho-phosphoric acid $H_3PO_4$. The tetra-phosphoric acid may be manufactured by the gradual and controlled dehydration by heating of ortho-phosphoric acid or pyro-phosphoric acid or by adding phosphorus pentoxide to these acids in proper amounts. When the latter procedure is followed, phosphorus pentoxide is added gradually (while absorbing heat of reaction) until it amounts to 520% by weight of the total water present. After a considerable period of standing at ordinary temperatures, the crystals of the tetra-phosphoric acid separate from the viscous liquid and it is found that these crystals melt at approximately 93° F. and have a specific gravity of 1.1866 at a temperature of 60° F. However, it is unnecessary to crystallize the tetraphosphoric acid before employing it in the preparation of the solid catalyst inasmuch as the crude tetra-phosphoric acid mixture may be incorporated with the siliceous adsorbent and aforementioned pine wood pitch resin.

The materials which may be employed as adsorbents or carriers for phosphoric acid in the production of catalysts of the type herein set forth are predominantly of siliceous character and include diatomaceous earth, kieselguhr, artificially prepared silica, and certain members of the class of aluminum silicates including naturally occurring substances such as various fuller's earths and clays, such as bentonite, montmorillonite, acid-treated clays and the like. Each adsorbent or supporting material which may be used alternately or in admixture with one another will exert its own specific influence upon the effectiveness of the catalyst composite which will not necessarily be identical with other members of this class of siliceous materials.

Catalysts may be prepared from acids of phosphorus such as ortho-phosphoric acid, pyro-phosphoric acid, tri-phosphoric acid, or tetra-phosphoric acid, and a siliceous adsorbent containing a pine wood pitch resin substantially insoluble in paraffinic hydrocarbons by the successive steps of mixing the resin with the siliceous material and thereafter mixing the phosphoric acid with the commingled relatively finely divided carrier composite at room temperature of approximately 70° F. or at an elevated temperature which is preferably within the approximate range of from about 250° to about 450° F. to form a paste, or plastic mass (the phosphoric acid originally being in major proportion by weight). The aforementioned ingredients are preferably mixed in the proportions of from about 50 to about 75% by weight of a phosphoric acid, from about 20 to about 49.5% by weight of the siliceous adsorbent, and from about 0.5 to about 5% by weight of the pine wood pitch resin. The paste or plastic mass resulting from the mixing of the phosphoric acid, siliceous adsorbent and pine wood pitch resin substantially insoluble in paraffinic hydrocarbons is then formed into shaped particles by extrusion and cutting or other suitable means and the resultant particles are then dried at a temperature of from about 350° to about 500° F. to form a substantially solid material which is then calcined further at a temperature generally from about 500° to about 900° F. The calcining may be carried out by heating in a substantially inert gas, such as air, nitrogen, and the like. The resultant catalyst is active for polymerizing olefinic hydrocarbons, particularly for polymerizing normally gaseous olefinic hydrocarbons to form normally liquid hydrocarbons suitable for use as constituents of gasoline having a high antiknock rating. When employed in the conversion of olefinic hydrocarbons into polymers, the calcined catalyst formed as herein set forth, is preferably employed as a granular layer in a heated reactor, which is generally made from steel, and through which the preheated hydrocarbon fraction is directed. The solid catalyst of this process may thus be employed for treating mixtures of hydrocarbon vapors to effect olefin polymerization, but this same catalyst may also be used at operating conditions suitable for maintaining liquid phase operation during polymerization of olefinic hydrocarbons, such as butylenes, to produce gasoline fractions. Thus when employed in the polymerization of normally gaseous olefins in admixture with paraffin gases, the formed and calcined catalyst particles are generally placed in a vertical, cylindrical treating tower and the olefin-containing gas mixture is passed downwardly therethrough at a temperature of from about 350° to about 550° F., and at a pressure of from about 100 to about 2,000 pounds per square inch. When operating on a mixture comprising essentially butanes and butylenes, this catalyst is effective at conditions favoring the maximum utilization of both normal butylenes and isobutylene which involves mixed polymerization at temperatures of from approximately 275° to about 325° F. and at pressures of from about 500 to about 1,500 pounds per square inch.

In utilizing the catalyst of this invention for promoting miscellaneous organic reactions, the catalyst may be employed in essentially the same way as it is used when polymerizing olefins, in case the reactions are essentially vapor phase and it may be employed in suspension also in liquid phase in various types of equipment.

With suitable modifications in the details of operation, the present type of catalyst may be employed in a large number of organic reactions, including polymerization of olefins as already mentioned. Typical cases of reaction in which the present type of catalyst may be used are the akylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc., reactions involving the hydrohalogenation of unsaturated organic compounds, isomerization reactions, ester formation by the interaction of carboxylic acids and olefins, and the like. The specific procedure for utilizing the present type of catalyst in miscellaneous organic reactions will be determined by the chemical and physical characteristics and the phase of the reacting constituents.

During use of my catalysts in vapor phase polymerizations and other vapor phase treatments of organic compounds, it is advisable to add small amounts of moisture to prevent excessive dehydration and subsequent decrease in catalyst activities. In order to substantially prevent loss of water from the catalyst an amount of water or water vapor such as steam is added to the charged olefinic gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activities during polymerization use and also suffer a marked decrease in crushing strength due to softening of the catalyst. Such softening of the catalyst also results in short catalyst life inasmuch as the catalyst towers become plugged during use. I have found, however, that catalysts of good crushing strength may be produced by adding to composite of phosphoric acid and diatomaceous earth, a relatively small amount of pine wood pitch resin referred to commercially as "Vinsol resin." The term "Vinsol resin" is a trade-mark registered by the Hercules Powder Company and is referred to herein to designate the resin disclosed in lines 31–45, column 1, page 1, of United States Letters Patent No. 2,114,393 issued to Fred H. Lane, and more fully disclosed in United States Letters Patent No. 2,193,026 which was issued to Lucius C. Hall. Vinsol resin is a by-product obtained in the reclaiming and refining of "stump"

rosin. The extracted pine wood pitch resin comprises a residue low in abietic acid remaining after the separation of refined rosin high in abietic acid from the resinous material obtained by extraction of pine wood with a solvent. The exact chemical nature of the Vinsol resin is not known but there is some evidence that it probably comprises chemical reaction products of oxidized rosin and the degradation products of lignin.

Vinsol resin is a pine wood resin produced by extracting resinous wood with a coal tar hydrocarbon, removing said hydrocarbon by evaporation to leave a residue, extracting the residue with a paraffinic hydrocarbon fraction, and recovering from the extracted residue a resin which is substantially insoluble in paraffinic hydrocarbons. Vinsol resin thus differs from wood rosin in that the latter is soluble in paraffinic hydrocarbon fractions.

The following examples of the preparation of catalysts comprised within the scope of this invention and results obtained in their use for catalyzing polymerization of propylene are characteristic, although the exact details set forth are not to be construed as imposing undue limitations upon the generally broad scope of the invention.

The attached table shows comparative results obtained in autoclave tests on solid phosphoric acid catalyst containing various concentrations of Vinsol resin admixed with the diatomaceous earth carrier composited with phosphoric acid. These catalytic activity tests were carried out by placing 10 grams of 5 x 5 mm. pellets of the catalyst and 100 grams of a propane-propylene mixture (50-55% of propylene content) in a rotatable steel autoclave of 850 cc. capacity, which was rotated at a temperature of 450° F. for two hours. At the end of that time, determinations were made to indicate the percentage of conversion of propylene into liquid polymers.

Catalyst composites formed from diatomaceous earth and phosphoric acid mixtures and containing 1 and also 5% of Vinsol resin (a pine wood pitch resin), are more active and have higher crushing strengths than similar catalysts produced from only phosphoric acid and diatomaceous earth. The propylene polymerizing activity and crushing strength of these catalysts are given in the following table:

and 25 grams of diatomaceous earth. The Vinsol resin was thoroughly dispersed into the phosphoric acid and then the diatomaceous earth was worked into the acid in small portions at a time to form a plastic material which was dried in air while being heated with an infra-red lamp until the plastic mixture reached a consistency satisfactory for pressing into small cylindrical openings in a steel pill plate. The pills of the catalyst mixture were dried for one-half hour at a temperature of 392° F., then removed from the pill plate and calcined one hour at 500° F. in air. The catalyst so produced had an apparent bulk density of 0.668 and a crushing strength of 11.4 pounds when fresh.

Catalyst No. 2 also containing 1% Vinsol resin was prepared by calcining catalyst No. 1 for one hour in a slow stream of nitrogen at a temperature of 860° F. The resultant calcined catalyst had an apparent bulk density of 0.627 and an average crushing strength of 20.8 pounds when fresh, and a grayish black color.

Catalyst No. 3 containing 5% of Vinsol resin was prepared from 3.9 grams of pulverized Vinsol resin, 80.5 grams of phosphoric acid and 25 grams of diatomaceous earth in the same manner as was used in producing catalyst No. 1. The Vinsol resin did not dissolve in the phosphoric acid but nevertheless was thoroughly dispersed therein before the addition of diatomaceous earth began. The resultant plastic material was then formed into pellets by the pill plate method. The pellets in the pill plate were dried for one-half hour at a temperature of 392° F. and calcined in air for one hour at a temperature of 500° F. The resultant dried catalyst particles had an apparent bulk density of 0.554, an average crushing strength of 22.4 pounds when fresh.

Catalyst No. 4 containing 5% of Vinsol resin was prepared by calcining catalyst No. 3 for one hour in a block furnace at a temperature of 860° F., in a slow stream of nitrogen. The resultant calcined catalyst had an apparent bulk density of 0.532, an average crushing strength of 24.7, and a black color.

I claim as my invention:

1. A process for manufacturing a solid catalyst which comprises mixing from about 50 to about 75% by weight of a phosphoric acid, from about 20 to about 49.5% by weight of a siliceous adsorbent, and from about 0.5 to about 5% by Table Test Conditions: 10 g. Catalyst, 100 g. Propane-Propylene feed (with 51.1–53.1 mole per cent $C_3H_6$) content, 2 hours at 450° F. (232° C.) in 850 cc. rotating autoclave

| Catalyst Number | Catalyst Description | | | Percent Conversion of $C_3H_6$ | Crushing Strength, lbs. | |
|---|---|---|---|---|---|---|
| | Phosphoric acid-diatomaceous composite containing percent Vinsol resin | Calcination Temp. °F. | Time, hours | | Before test | After test |
| 1 | 1 | 500 | 1 | 67 | 11.4 | 2.4 |
| 2 | 1 | 860 | 1 | 79 | 20.8 | 24.4 |
| 3 | 5 | 500 | 1 | 81 | 22.4 | 4.2 |
| 4 | 5 | 860 | 1 | 74 | 24.7 | 26.8 |
| 5 | 0 | Commercially prepared | | 66 | 11.4 | 5.4 |
| 6[1] | 0 | 860 | 1 | 48 | 16 | 9 |

[1] Commercial catalyst No. 5 calcined further as indicated.

The catalysts referred to in the preceding table were prepared as follows:

Catalyst No. 1 containing 1% Vinsol resin was prepared from 0.8 gram of pulverized Vinsol resin, 80.5 grams of 85% orthophosphoric acid weight of a pine wood pitch resin substantially insoluble in paraffinic hydrocarbons to form a composite, drying and calcining said composite.

2. A process for manufacturing a solid catalyst which comprises mixing from about 50 to about 75% by weight of a phosphoric acid, from about 20 to about 49.5% by weight of a siliceous adsorbent, and from about 0.5 to about 5% by weight of a pine wood pitch resin substantially insoluble in paraffinic hydrocarbons to form a composite, forming said composite into particles, drying and calcining said composite.

3. A process for manufacturing a solid catalyst which comprises mixing from about 50 to about 75% by weight of a phosphoric acid, from about 20 to about 49.5% by weight of a siliceous adsorbent, and from about 0.5 to about 5% by weight of a pine wood pitch resin substantially insoluble in paraffinic hydrocarbons at a temperature of from about 70° to about 450° F. to form a composite, drying said composite at a temperature of from about 350° to about 500° F., and calcining the dried composite at a temperature of from about 500° to about 900° F.

4. A process for manufacturing a solid catalyst which comprises mixing from about 50 to about 75% by weight of a phosphoric acid, from about 20 to about 49.5% by weight of a siliceous adsorbent, and from about 0.5 to about 5% by weight of a pine wood pitch resin substantially insoluble in paraffinic hydrocarbons at a temperature of from about 70° to about 450° F., to form a composite, forming said composite into particles, drying said particles at a temperature of from about 350° to about 500° F. and calcining the dried particles at a temperature of from about 500° to about 900° F.

5. A process for manufacturing a solid catalyst which comprises mixing from about 50 to about 75% by weight of a polyphosphoric acid, from about 20 to about 49.5% by weight of a siliceous adsorbent, and from about 0.5 to about 5% by weight of a pine wood pitch resin substantially insoluble in paraffinic hydrocarbons to form a composite, drying and calcining said composite.

6. A process for manufacturing a solid catalyst which comprises mixing from about 50 to about 75% by weight of pyrophosphoric acid, from about 20 to about 49.5% by weight of a siliceous adsorbent, and from about 0.5 to about 5% by weight of a pine wood pitch resin substantially insoluble in paraffinic hydrocarbons to form a composite, drying and calcining said composite.

7. A process for manufacturing a solid catalyst which comprises mixing from about 50 to about 75% by weight of pyrophosphoric acid, from about 20 to about 49.5% by weight of diatomaceous earth, and from about 0.5 to about 5% by weight of a pine wood pitch resin substantially insoluble in paraffinic hydrocarbons to form a composite, drying and calcining said composite.

8. A process for manufacturing a solid catalyst, which comprises mixing from about 50 to about 75% by weight of pyrophosphoric acid, from about 20 to about 49.5% by weight of diatomaceous earth, and from about 0.5 to about 5% by weight of a pine wood pitch resin substantially insoluble in paraffinic hydrocarbons at a temperature of from about 70° to about 450° F. to form a composite, drying said composite at a temperature of from about 350° to about 500° F., and calcining the dried composite at a temperature of from about 500° to about 900° F.

9. A process for manufacturing a solid catalyst which comprises mixing from about 50 to about 75% by weight of pyrophosphoric acid, from about 20 to about 49.5% by weight of diatomaceous earth, and from about 0.5 to about 5% by weight of a pine wood pitch resin substantially insoluble in paraffinic hydrocarbons at a temperature of from about 70° to about 450° F., to form a composite, shaping said composite into particles, drying said particles at a temperature of from about 350° to about 500° F., and calcining the dried particles at a temperature of from about 500° to about 900° F.

10. A solid catalyst comprising a calcined mixture of from about 50 to about 75% by weight of a phosphoric acid, from about 20 to about 49.5% by weight of a siliceous adsorbent, and from about 0.5 to about 5% by weight of a pine wood pitch resin substantially insoluble in paraffinic hydrocarbons.

11. A solid catalyst comprising a calcined mixture of from about 50 to about 75% by weight of pyrophosphoric acid, from about 20 to about 49.5% by weight of diatomaceous earth, and from about 0.5 to about 5% by weight of a pine wood pitch resin substantially insoluble in paraffinic hydrocarbons.

MITCHELL S. BIELAWSKI.

REFERENCES CITED

The following references are of record in the file of this patent:

UNITED STATES PATENTS

| Number | Name | Date |
|---|---|---|
| 2,120,702 | Ipatieff et al. | June 14, 1938 |
| 2,120,723 | Watson | June 14, 1938 |